Patented Mar. 26, 1929.

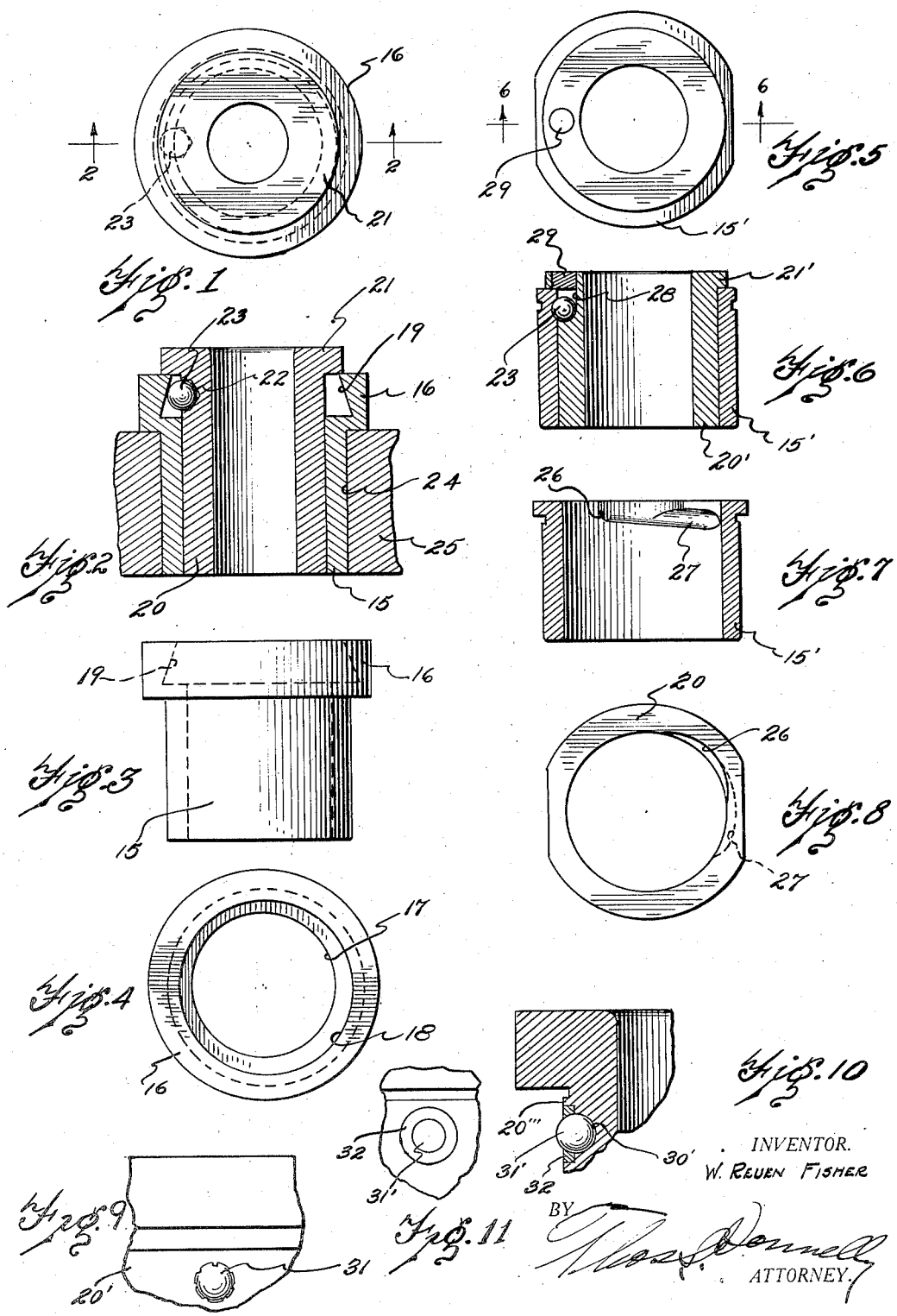

1,706,847

UNITED STATES PATENT OFFICE.

W. REUEN FISHER, OF DETROIT, MICHIGAN.

JIG BUSHING.

Application filed November 21, 1925. Serial No. 70,468.

My invention relates to a new and useful improvement in a bushing and especially relates to drilling and reaming jig bushings adapted for use in guiding drills and reamers in their operation.

With such bushings it is desirable, in order that a standard insertion may be had to provide a liner bushing which is mounted in a jig plate. The guide bushing is then inserted into the liner bushing. Various means of locking the guide bushing in operative position relatively to the liner bushing have been devised and the present invention relates to a cooperating liner bushing and a guide bushing provided with locking means which will be simple in structure, economical of manufacture, and highly efficient in use.

An object of the invention is also the provision in a bushing arrangement of this class of a locking mechanism positioned adjacent the upper end of the bushings and adapted upon rotation of the guide bushing relatively to the liner bushing for moving the guide bushing into the desired cooperative position and locking it in position.

Another object of the invention is the provision of a locking mechanism of this class which will effectively and securely serve to lock the bushings in proper relative position for operation and at the same time permit a ready and quick release of the bushing for removal of the guide bushing from the liner bushing.

Other objects will appear hereinafter.

The invention consists in the combination and arrangement of parts hereinafter described and claimed.

The invention will be best understood from a reference to the accompanying drawings, which form a part of this specification and in which, Fig. 1 is a top plan view of the invention showing the bushings in assembled relation.

Fig. 2 is a sectional view taken on substantially line 2—2 of Fig. 1, showing the bushings mounted in the jig plate.

Fig. 3 is a side elevational view of the liner bushing.

Fig. 4 is a top plan view of the liner bushing.

Fig. 5 is a top plan view of assembled bushings showing a modified form of retaining the locking mechanism is position.

Fig. 6 is a sectional view taken on substantially line 6—6 of Fig. 5.

Fig. 7 is a sectional view similar to Fig. 6 with the guide bushing removed.

Fig. 8 is a top plan view of the liner bushing shown in Fig. 5.

Fig. 9 is a fragmentary side elevational view showing a modified form of mounting the locking mechanism.

Fig. 10 is a fragmentary sectional view showing a further modified form of mounting in the locking mechanism.

Fig. 11 is a fragmentary side elevational view of the locking mechanism shown in Fig. 10.

In the preferred form of construction shown in Fig. 1 a liner bushing 15 is provided with a head 16. The main body of the bushing is provided with a concentric bore 17 and the head 16 is cut away to provide the eccentric counterbore 18—the head 16 having the inclined inner surface 19 as clearly appears from Figs. 2 and 3. A guide bushing 20 is provided so constructed as to be adapted for a slip fit into the liner bushing 15. This guide bushing 20 is provided with a flange head 21. Formed in the body of the bushing 20 below the head 21 is a recess 22 in which is positioned a ball 23.

In mounting the device for operation the liner bushing 15 is pressed into the opening 24 which is formed in the jig plate 25. This opening 24 will of course be properly locked for practical purposes. The guide bushing 20 is then inserted into the liner bushing 15 and the ball 20 placed in the recess 22. On account of the eccentric counterbore the ball 23 will move into the counterbore 18 only when the guide bushing 20 is properly turned. When the guide bushing 20 is inserted fully into the liner bushing 15 a rotation of the guide bushing 20 in the liner bushing 15 will cause the ball 23 to engage tightly against the inclined surface 19 of the counterbore 18. On account of the incline of the surface 19 and on account of the eccentric formation of the counterbore 18 the guide bushing 20 will be, when it has been rotated sufficiently relatively to the liner bushing 15, securely locked against movement relatively to the liner bushing 15 longitudinally of itself. The engagement of the inclined surfaces 19 with the ball 23 will also serve to retain the flange head 21 in close engagement with the outer surface of the head 16. In order to remove the guide bushing 20 from the liner bushing 15 a reverse rotation of the guide bushing 20 is necessary. Inasmuch as the tools used with these bushings rotate in a clockwise direction the guide bushing 20 will be rotated in a clockwise direction in order to effect the desired locking. The rotation of the guide bushing 20 to effect its release in order to remove it from the liner bushing 15 will consequently be in a counter-clockwise direction. On account of the locking member 23 comprising a sphere as shown and on account of it being rotatable in the recess 22 a ready and easy release is possible.

In the form shown in Fig. 5 the liner bushing 15' is pressed into the jig plate as already described. The guide bushing 20' is adapted for a slip fit into the liner bushing 15'. This guide bushing 20' being provided with the flange head 21'. As clearly appears in Fig. 8 the liner bushing 20' is cut away as at 26 to provide a recess,—this recess communicating with a spirally inclined groove 27. A longitudinally extending recess 28 is formed in the guide bushing 20' and loosely positioned in this recess 28 is the locking ball 23'—a suitable plug 29 being used for closing the outer end of the recess 28 so as to prevent the ball 23' from falling out of it. This recess is formed as shown longitudinally of the guide bushing 20' adjacent its upper end and is concave in cross-section to provide a snug seat for the engaging surface of the locking ball or sphere 23'. This recess 28 is of less depth than the diameter of the locking ball 23' and consequently breaks open the outer surface of the guide bushing 20' so that a portion of the ball 23' projects outwardly from the periphery of the guide bushing 20'.

In operation the guide bushing 20' is rotated until the locking ball 23' is in registration with the recess or cut-away portion 26, at which time the guide bushing 20' may be rotated for bringing the locking ball 23' into the spirally directed groove 27. This groove is also of concave formation and grooved in cross-section. As the locking ball 23' is forced toward the end of the groove 27 the guide bushing 20' will be moved longitudinally over the liner bushing 15' so as to bring the flange head 21' into close engagement with the upper surface of the liner bushing 15' while at the same time locking the guide bushing 20' against rotation relatively to the liner bushing 15' in one direction. The loose mounting of the ball 23' in the recess 28 will permit the ready and easy release while at the same time assuring a tight and rigid mounting.

It will be noted from Fig. 8 that the groove 21 finally terminates in an incline end so that as the ball 23' is brought into engagement with this incline end it presses against the inner surface of the recess 28 and against the surface of the grooves 27 so as to effect, by friction the desired locking.

In the form shown in Fig. 9 I have provided a recess 30 in which the locking ball 31 may be positioned,—this recess 30 being formed in the guide bushing 22. In the manufacture of these bushings it is desirable that the bushings be hardened in order to resist the wear to which they are subjected. Consequently in order to secure the ball 31 in the recess 30 by peening or the like it is necessary that the material surrounding the recess or pocket 30 be of very soft material to permit the peening. In order to accomplish this, during the hardening process the material immediately surrounding the recess 30 is protected so that hardening will not take place, thus leaving a slight amount of soft metal around the recess for peening purposes.

In the modified form shown in Figs. 10 and 11 the bushing 23 is provided with a recess or pocket 30' in which the locking ball 31' is positioned. A suitable plate 32 is placed into the recess to retain the locking ball 31' in position—this plate 32 being provided with an opening through which the ball 31' may project the desired distance.

In all of the forms shown there is provided a locking mechanism mounted in a recess which when operated as described will give the necessary locking effect and at the same time permit a quick and ready release.

While I have illustrated and described the preferred form of structure, I do not wish to limit myself to the precise form of structure shown, but desire to avail myself of such variations and modifications as come within the scope of the appended claims.

Having thus described my invention what I claim as new and desire to secure by Letters Patent is:

1. A liner bushing adapted for mounting in a jig plate; a guide bushing adapted for a slip fit in said liner bushing, said guide bushing having a recess adjacent its upper end; a spherical locking member mounted in said recess and engageable with the inner surface of said liner bushing upon rotation of said guide bushing relatively thereto beyond a predetermined distance, the inner surface of said liner bushing, adjacent its upper end, being of a formation for engaging said locking member for exerting pressure thereon radially of the bushing for effecting a wedging of said locking member between said inner surface and the base of said recess, and a locking of said bushings against relative movement.

2. A liner bushing adapted for mounting in a jig plate, said liner bushing having an eccentric inner surface adjacent its upper end; a guide bushing adapted for a slip fit in said liner bushing and having a recess formed in its periphery adjacent its upper end, said recess being in alignment with said eccentric inner surface upon locating of said bushings in cooperative relation; and a spherical locking member loosely mounted in said recess for engaging said eccentric inner surface for locking said bushings in fixed relation upon rotation of said guide bushing relatively to said liner bushing beyond a predetermined point, the rotation of said guide bushing, after engagement with said eccentric inner surface with said locking member, effecting a wedging of said locking member between the base of said recess and said inner surface.

In testimony whereof, I have signed the foregoing.

W. REUEN FISHER.